US012585745B2

(12) United States Patent \
Choi et al.

(10) Patent No.: US 12,585,745 B2 \
(45) Date of Patent: Mar. 24, 2026

(54) SYSTEM FOR AUTHENTICATING REMOTE DRIVER IN REAL TIME USING IMAGE AND ARTIFICIAL INTELLIGENCE

(71) Applicant: DaonLink Co., Ltd., Seoul (KR)

(72) Inventors: Jong Won Choi, Seoul (KR); Kwang Bok Park, Hwaseong-si (KR)

(73) Assignee: DaonLink Co., Ltd., Seoul (KR)

( * ) Notice: Subject to any disclaimer, the term of this patent is extended or adjusted under 35 U.S.C. 154(b) by 161 days.

(21) Appl. No.: 18/431,152

(22) Filed: Feb. 2, 2024

(65) Prior Publication Data

US 2025/0181688 A1 Jun. 5, 2025

(30) Foreign Application Priority Data

Dec. 1, 2023 (KR) ........................ 10-2023-0172226

(51) Int. Cl. \
*G06F 21/32* (2013.01)

(52) U.S. Cl. \
CPC .................................... *G06F 21/32* (2013.01)

(58) Field of Classification Search \
None \
See application file for complete search history.

(56) References Cited

U.S. PATENT DOCUMENTS

| | | | | | |
|---|---|---|---|---|---|
| 2019/0340423 | A1* | 11/2019 | Kim | ..................... | G06V 40/165 |
| 2024/0001888 | A9* | 1/2024 | Julian | ................... | B60R 25/257 |

FOREIGN PATENT DOCUMENTS

| | | | | | |
|---|---|---|---|---|---|
| CN | 113946858 | B | * | 3/2022 | ............... G06N 3/04 |
| JP | 7158692 | B2 | * | 10/2022 | ............ G06F 21/32 |
| KR | 10-2012-0055083 | A | | 5/2012 | |
| KR | 10-1805716 | B1 | | 12/2017 | |
| KR | 102028757 | B1 | * | 10/2019 | ............ G02B 27/01 |
| KR | 10-2411864 | B1 | | 6/2022 | |
| KR | 10-2023-0040626 | A | | 3/2023 | |

* cited by examiner

*Primary Examiner* — Younes Naji \
(74) *Attorney, Agent, or Firm* — Sughrue Mion, PLLC

(57) ABSTRACT

Provided is a system for authenticating a remote driver in real time using an image and artificial intelligence. The system for authenticating a remote driver in real time according to an embodiment of the present invention includes: a face detection unit mounted on construction equipment to detect a face of a driver on board; a remote control station configured to transmit facial data of the driver on board detected through the face detection unit to an authentication unit, receive a driver information search result and an authentication determination result from the authentication unit, and start the construction equipment; and the authentication unit configured to search for the facial data of the driver on board received from the remote control station from driver information data stored in a database and transmit the driver information search result and the authentication determination result to the remote control station.

2 Claims, 19 Drawing Sheets

SYSTEM FOR AUTHENTICATING REMOTE DRIVER IN REAL TIME (100)

FIG. 2

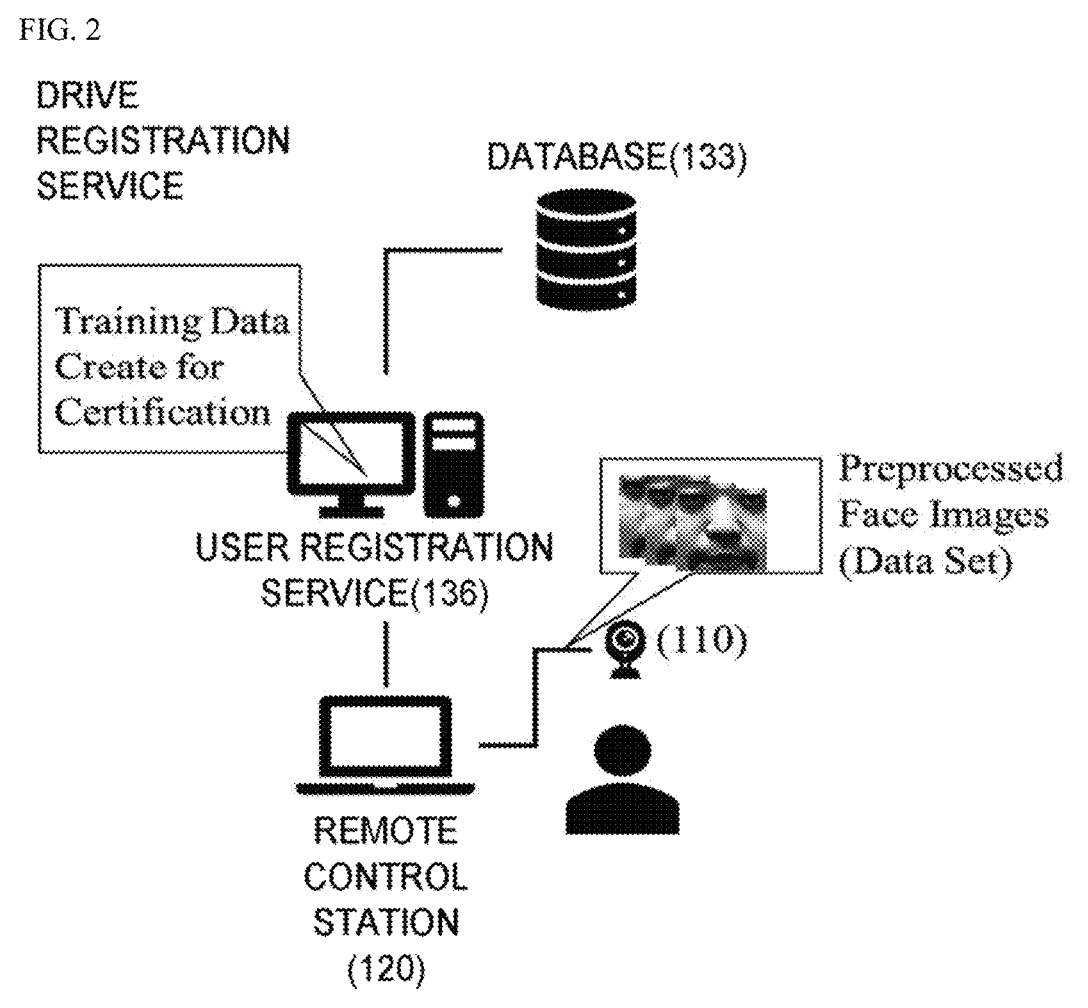

DRIVE
REGISTRATION
SERVICE

DATABASE(133)

Training Data
Create for
Certification

USER REGISTRATION
SERVICE(136)

Preprocessed
Face Images
(Data Set)

(110)

REMOTE
CONTROL
STATION
(120)

<PROCESS OF DISCRIMINATING PRESENCE/ABSENCE OF FACE IN DETECTED FACE AREA>

(a)

(b)

EYE, NOSE, MOUTH POSITION
ESTIMATION AREAS IN FACE IMAGE

DETECT BOTH EYES TO DISCRIMINATE FRONT FACE,
AND DETECT NOSE AND MOUTH
TO FIND ROTATION CENTER POINT

ANGLE BETWEEN X-AXIS AND STRAIGHT LINE PASSING THROUGH CENTER POINTS OF BOTH PUPILS θ

IDEAL EYE POSITION CENTER LINE -> PARALLEL TO X-AXIS

ACTUALLY MEASURED EYE POSITION CENTER LINE -> SLOPE DIFFERENCE θ FROM X-AXIS

ROTATION CENTER POINT P

CENTER OF GRAVITY OF NOSE N

CENTER OF GRAVITY OF MOUTH M

θ

IMAGE SURPLUS AREA

IMAGE LOST AREA

θ

USING LINEAR INTERPOLATION

<IMAGE REDUCTION>    <IMAGE ENLARGEMENT>

IMAGE SURPLUS AREA

ROTATION CENTER P

Y

IMAGE
LOST AREA

<EXTRACT ONLY AREAS CONTAINING EYES, NOSE, AND MOUTH>

Histogram Equalize

Histogram Equalize

Histogram Equalize

<IMAGE GENERATED THROUGH HISTOGRAM EQUALIZATION>

<HISTOGRAM EQUALIZATION RESULT OF ALL AREAS>

RIGHT FACIAL AREA

CENTER FACIAL AREA

LEFT FACIAL AREA

MASK IMAGE

X
SYNTHESIS

IMAGE GENERATED
THROUGH HISTOGRAM
EQUALIZATION

SYNTHESIZED IMAGE 36 pixel 36 pixel

ELEMENTS OF
DATASET/REAL-TIME
DATA FOR AUTHENTICATION

| EIGENVECTOR VALUES DETECTED THROUGH LBPH | |
|---|---|
| Class Number | PCA Vector |
| 0 | 03e+06 |
| 1 | 09e+06 |
| 2 | 23e+05 |
| 3 | 04e+05 |
| 4 | 66e+05 |
| 5 | 31e+05 |
| 6 | 85e+05 |
| 7 | 23e+05 |
| 8 | 18e+04 |
| 9 | 61e+04 |
| 10 | 91e+04 |
| 11 | 52e+04 |

FACE IMAGE REPRESENTED USING EIGENVECTOR VALUES THROUGH PCA

52e+01

AFTER DETECTING CLOSEST VECTOR CLASS NUMBER/LDA OUTPUT

SEARCH DATA 52e+03

SYSTEM FOR AUTHENTICATING REMOTE DRIVER IN REAL TIME USING IMAGE AND ARTIFICIAL INTELLIGENCE

GOVERNMENT SUPPORT

This invention was made with support under Project Unique Number 2410004357 (Project Number 20018414) from the Ministry of Trade, Industry and Energy, Republic of Korea, through the Korea Evaluation Institute of Industrial Technology (KEIT). The research program is entitled "Development of Remote Control System and Technology for Earth-moving Construction Machinery used in Smart Construction," and was implemented by DASAN Networks.

CROSS-REFERENCE TO RELATED APPLICATION

This application claims priority to and the benefit of Korean Patent Application No. 10-2023-0172226, filed on Dec. 1, 2023, the disclosure of which is incorporated herein by reference in its entirety.

BACKGROUND

1. Field of the Invention

The present invention relates to a system for authenticating a remote driver in real time, and more specifically, to a system for authenticating a remote driver in real time using an image and artificial intelligence.

2. Discussion of Related Art

There have been efforts to overcome spatial/temporal limitations of work (use of equipment), and such efforts have come into actual implementation and use in numerous cases.

However, there are also cases of illegal use of personal equipment present on the Internet/cloud.

Additionally, attempts to steal equipment through physical access frequently occur. In fact, it is not easy to secure safety from such threats.

In order to securely use one's equipment online, it often requires login or complicated authentication procedures.

In other words, there are temporal/physical constraints on the use of equipment. Additionally, the absence of an alternative to physical access for equipment theft is a reality.

Therefore, there is a need for a technology that may address the issues associated with the related art described above, simplify the inconvenient authentication process in the use of equipment (work), and fundamentally block the threat of equipment theft through physical access.

RELATED ART DOCUMENTS

Patent Documents

Patent Document 1: Korean Patent Registration No. 10-1805716 (Nov. 30, 2017)

SUMMARY OF THE INVENTION

The present invention is directed to providing a system for authenticating a remote driver in real time capable of simplifying the inconvenient authentication process when using construction site equipment and fundamentally blocking the threat of equipment theft through physical access.

According to an aspect of the present invention, there is provided a system for authenticating a remote driver in real time, the system including: a face detection unit mounted on construction equipment to detect a face of a driver on board; a remote control station configured to transmit facial data of the driver on board detected through the face detection unit to an authentication unit, receive a driver information search result and an authentication determination result from the authentication unit, and start the construction equipment; and the authentication unit configured to search for the facial data of the driver on board received from the remote control station from driver information data stored in a database and transmit the driver information search result and the authentication determination result to the remote control station.

The authentication unit may include: an authentication system unit configured to pre-process the facial data of the driver on board transmitted from the face detection unit, and then encode the pre-processed data and transmit the encoded pre-processed data to an authentication service unit; the authentication service unit configured to decode the pre-processed data received from the authentication system unit, and then retrieve learned data to extract a driver KEY value and search driver information stored in the database, determine whether to authenticate based on a result of the searching from the database, and transmit an authentication determination result to the remote control station; and a control unit configured to receive a login execution signal from the remote control station according to the authentication determination result received from the authentication service unit and then transmit a driving signal of the construction equipment to the remote control station.

The authentication unit may include: a registration system unit configured to pre-process the facial data of the driver on board transmitted from the face detection unit, and then encode the pre-processed data and transmit the encoded pre-processed data to a registration service unit; and the registration service unit configured to decode the pre-processed data received from the registration system unit and then learn the facial data of the driver to create driver data, and transmit the created driver data to the authentication service unit, wherein the authentication service unit registers the driver data received from the registration service unit in the database.

The authentication unit may be configured to detect a face area using a local binary pattern (LBP)-based detector from the facial data of the driver on board transmitted from the face detection unit, and discriminate presence or absence of a face in the detected face area using a cascade classifier, and may be controlled by: a face pre-processing process in which a feature detection process, a geometric transformation and cropping process, a histogram equalization process, a noise control process, and an image normalization process are sequentially performed; a face data collection and training data creating process in which a specified number of image samples generated through the face pre-processing process are collected and labels are assigned to the database and the database is classified, and the classified database is trained to create data; and a face recognition and authentication granting process in which, with respect to a face image transmitted from the remote control station upon a request for real-time authentication, a labeled driver identification key (a class number) is extracted using a discriminator running in the authentication service unit, a similarity between the face image currently transmitted from the remote control station and training data is determined, and when a criterion is satisfied, user information in the database is searched for and a result of the searching is transmitted to the remote control station, and the remote control station that has completed authentication granting logs in to the construction equipment to complete an authentication procedure.

The feature detection process of the face pre-processing process may include: detecting a right eye, a left eye, a nose, and a mouth from the facial data of the driver on board transmitted from the face detection unit; extracting a pupil area for each eye; and confirming an area for both eyes and measuring a face direction using positions of the nose and the mouth.

The geometric transformation and cropping process of the face pre-processing process may include: rotating the face such that centers of both eyes are horizontal; adjusting a size of the face such that a space between the eyes is always the same; and transforming the face such that the eyes are always kept at a horizontal center and located at a desired height.

The image normalization process of the face pre-processing process may include: generating a mask image; removing undesired parts; and resizing a synthesized image to a preset size.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a schematic diagram illustrating a process of a driver registration service of a system for authenticating a remote driver in real time according to an embodiment of the present invention;

FIG. 6 is a flowchart showing a communication and operation sequence of a driver authentication service of a system for authenticating a remote driver in real time according to an embodiment of the present invention;

FIG. 8 is a schematic diagram illustrating a process of discriminating the presence or absence of a face in a face area detected using a cascade classifier;

FIG. 15 is a picture illustrating a process of removing an area outside the face;

DETAILED DESCRIPTION OF EXEMPLARY EMBODIMENTS

Hereinafter, embodiments of the present invention will be described in detail with reference to the accompanying drawings. Prior to describing the embodiments, terms and words used in the present specification and claims should not be construed as limited to the meanings defined in commonly used dictionaries, but should be construed as having meanings that are consistent with the technical idea of the present invention.

It will be understood that when an element is referred to as being "on" or "adjacent to" another element, it can be in direct contact or connected with another element or intervening elements may be present. The meaning that a part includes a certain component does not mean other components are excluded, but rather other components may be included, unless the context dictates otherwise.

Figure 1:
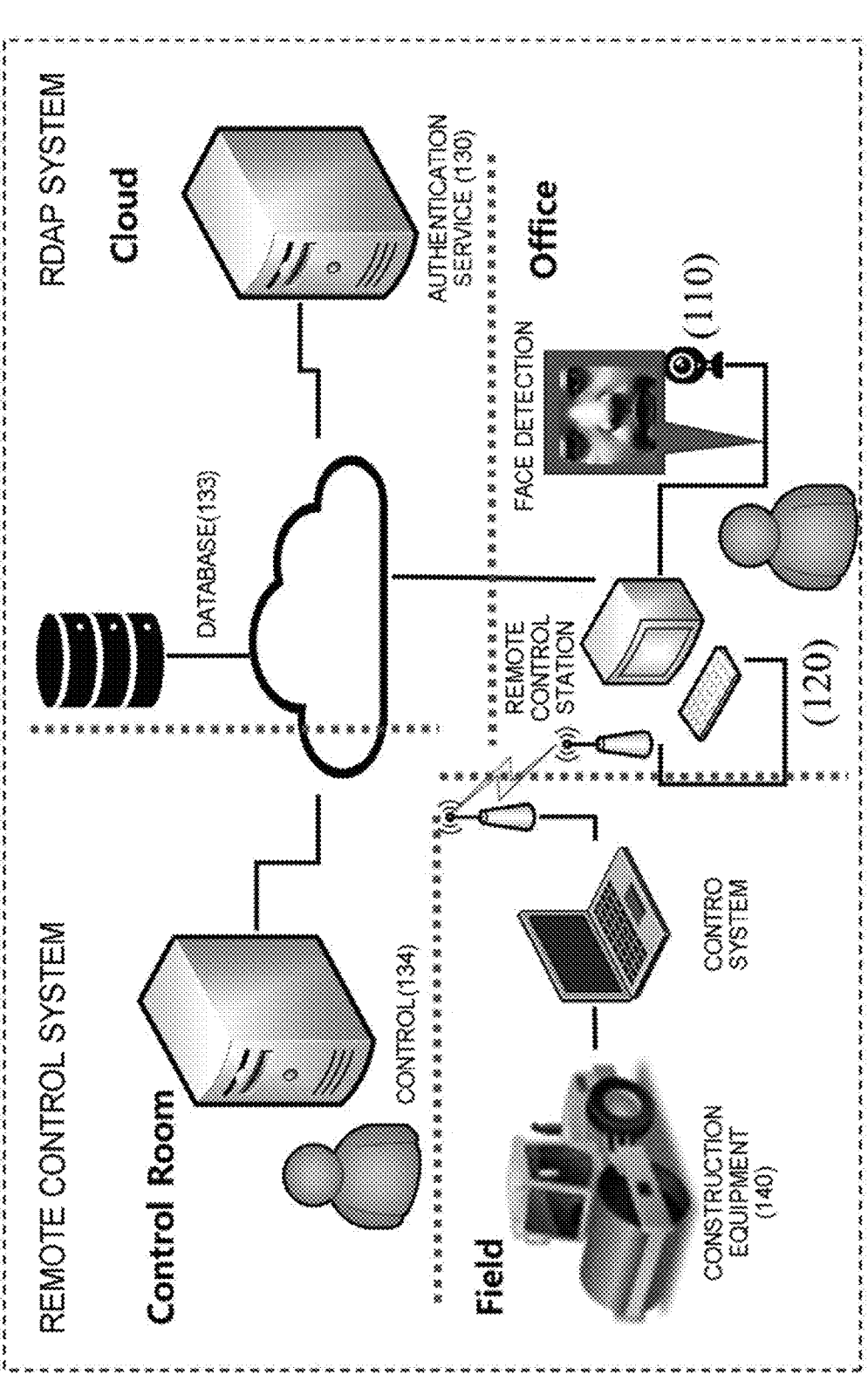
FIG. 1 is a block diagram illustrating a system for authenticating a remote driver in real time according to an embodiment of the present invention.

FIG. 1 is a block diagram illustrating a system for authenticating a remote driver in real time according to an embodiment of the present invention.

Referring to FIG. 1, a system 100 for authenticating a remote driver in real time according to an embodiment includes a face detection unit 110, a remote control station 120, and an authentication unit 130 which perform a specific function, thereby providing a system for authenticating a remote driver in real time by which an authentication process in the use of construction site equipment is performed through a simple approach and thus the inconvenient authentication process may be simplified, and unregistered drivers are prevented from operating the equipment, thus fundamentally blocking the threat of equipment theft through physical access.

Hereinafter, each component that constitutes the system 100 for authenticating a remote driver in real time according to the embodiment will be described in detail with reference to the drawings.

Figure 3:
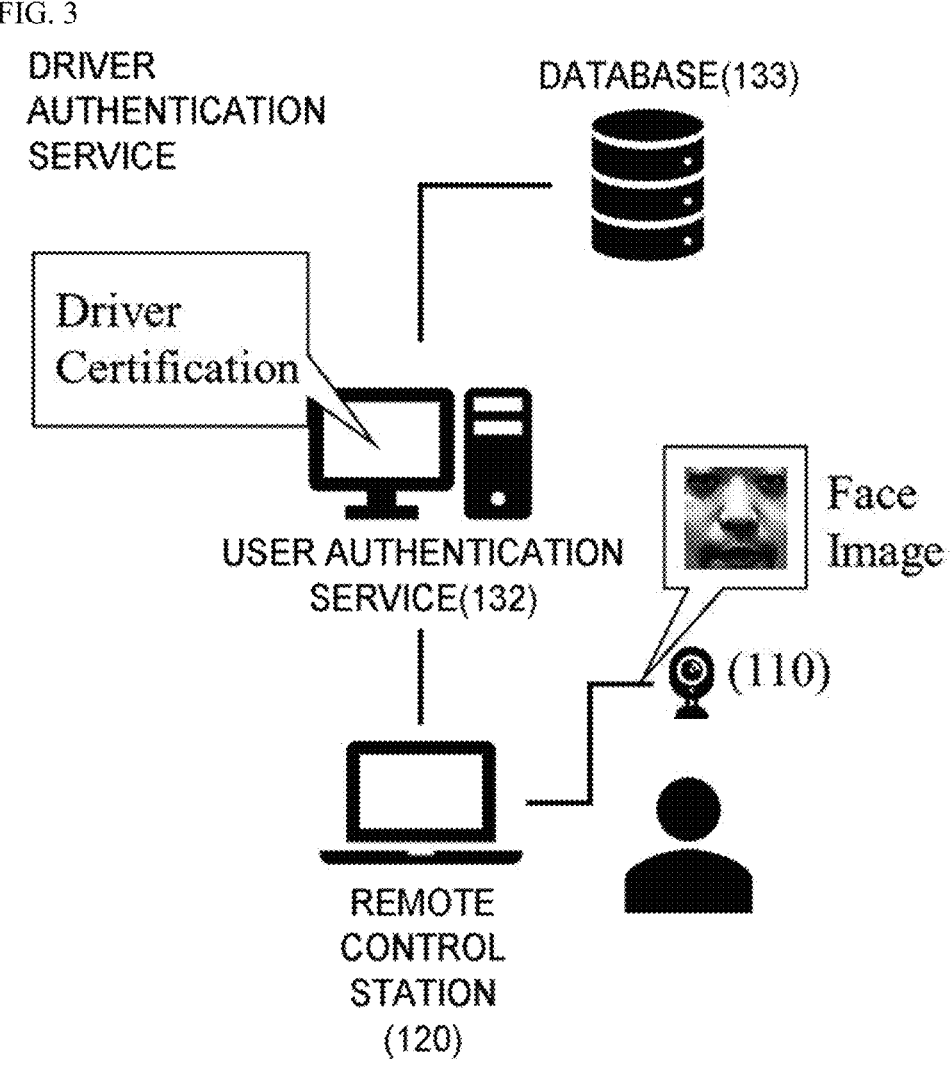
FIG. 3 is a schematic diagram illustrating a process of a driver authentication service of a system for authenticating a remote driver in real time according to an embodiment of the present invention.
Figure 4:
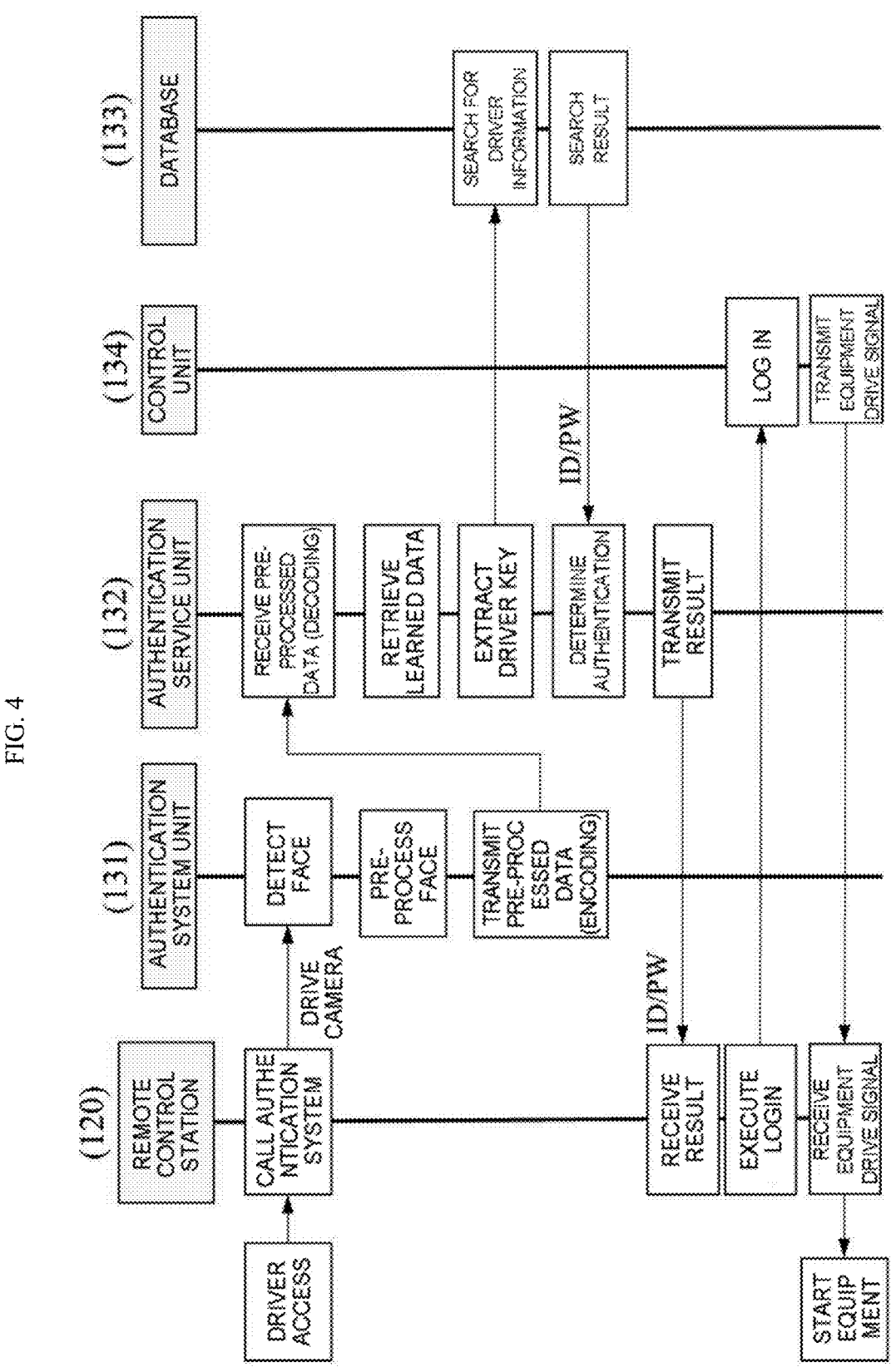
FIG. 4 is a flowchart showing a driver authentication procedure of a system for authenticating a remote driver in real time according to an embodiment of the present invention.
Figure 5:
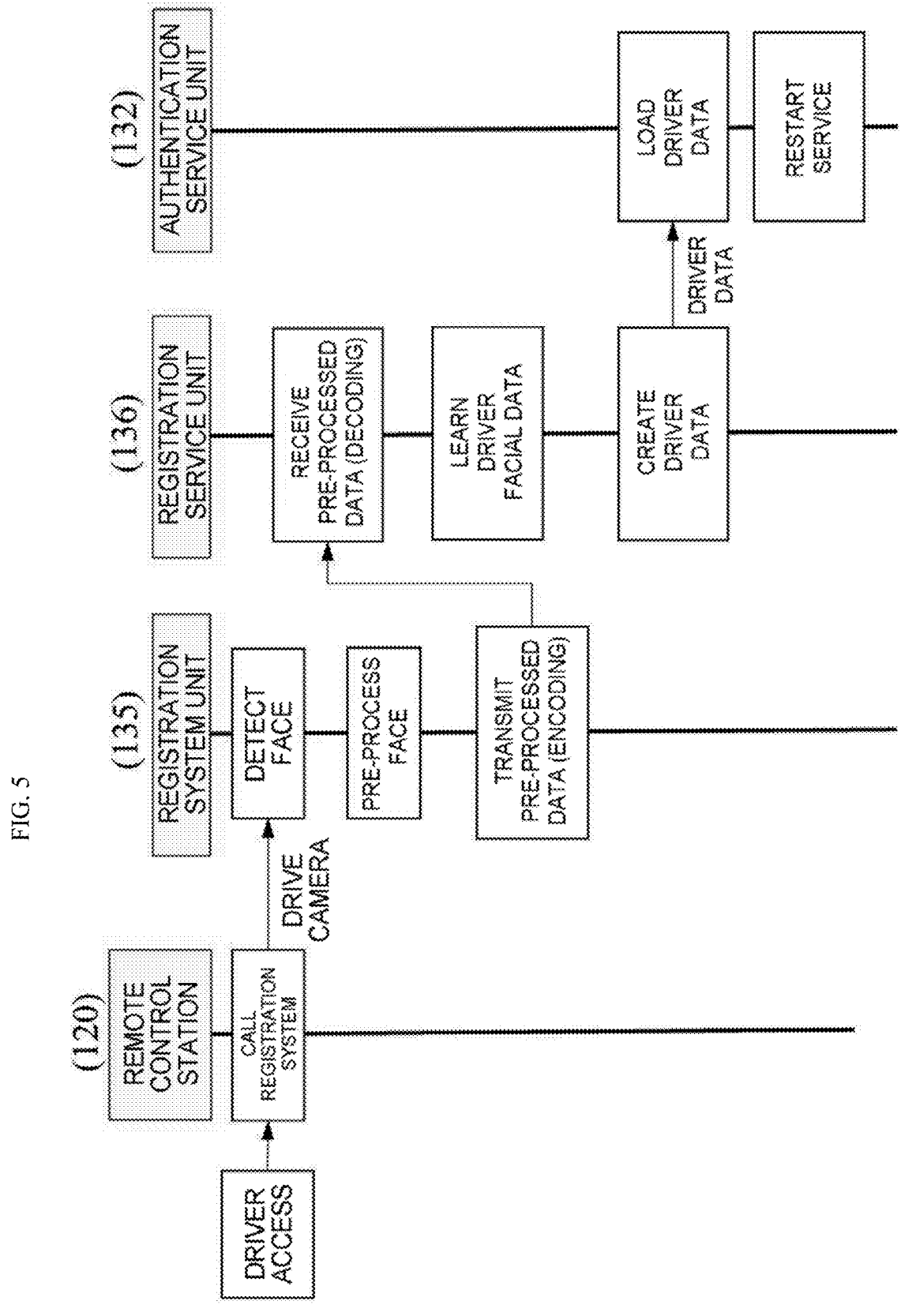
FIG. 5 is a flowchart showing a driver registration procedure of a system for authenticating a remote driver in real time according to an embodiment of the present invention.
Figure 6:
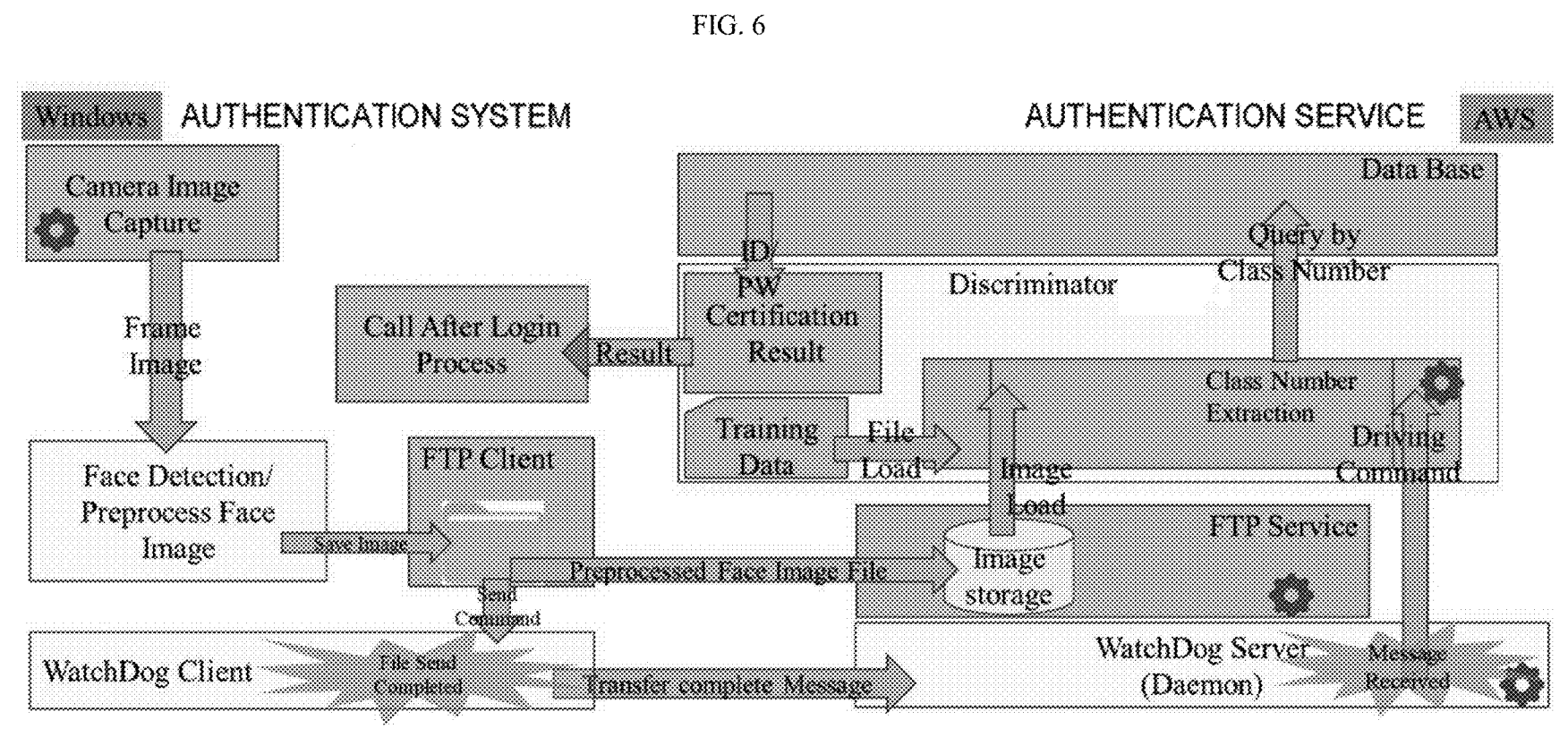

FIG. 2 is a schematic diagram illustrating a process of a driver registration service of a system for authenticating a remote driver in real time according to an embodiment of the present invention, FIG. 3 is a schematic diagram illustrating a process of a driver authentication service of a system for authenticating a remote driver in real time according to an embodiment of the present invention, FIG. 4 is a flowchart showing a driver authentication procedure of a system for authenticating a remote driver in real time according to an embodiment of the present invention, FIG. 5 is a flowchart showing a driver registration procedure of a system for authenticating a remote driver in real time according to an embodiment of the present invention, and FIG. 6 is a flowchart showing a communication and operation sequence of a driver authentication service of a system for authenticating a remote driver in real time according to an embodiment of the present invention.

Referring to FIGS. 1 to 6, the face detection unit 110 of the system 100 for authenticating a remote driver in real time according to the embodiment is mounted on construction equipment 140 to detect a face of a driver on board.

The remote control station 120 according to the embodiment transmits facial data of the driver on board detected through the face detection unit 110 to the authentication unit 130, receives a driver information search result and an authentication determination result from the authentication unit 130, and starts the construction equipment.

The authentication unit 130 according to the embodiment searches for the facial data of the driver on board received from the remote control station 120 from driver information data stored in a database 133 and transmits a search result and an authentication determination result to the remote control station 120.

Specifically, the authentication unit 130 according to the embodiment may include an authentication system unit 131, an authentication service unit 132, a database 133, and a control unit 134 which perform a specific function, as shown in FIGS. 3, 4, and 6. The authentication system unit 131 may pre-process facial data of the driver on board transmitted from the face detection unit 110, encode the pre-processed data, and then transmit the pre-processed data to the authentication service unit 132. The authentication service unit 132 may decode the pre-processed data received from the authentication system unit 131, retrieve learned data to extract a driver KEY value to search for driver information stored in the database 133, determine whether to authenticate based on a result of the searching from the database 133, and transmit an authentication determination result to the remote control station 120. In addition, the control unit 134 may receive a login execution signal from the remote control station 120 according to the authentication determination result received from the authentication service unit 132 and then transmit a driving signal of the construction equipment to the remote control station 120.

The authentication unit 130 according to the embodiment may include a registration system unit 135 and a registration service unit 136 which perform a specific function, as shown in FIGS. 2, 5, and 6. The registration system unit 135 may pre-process the facial data of the driver on board transmitted from the face detection unit 110, encode the pre-processed data, and then transmit the pre-processed data to a registration service unit 136. In addition, the registration service unit 136 may decode the pre-processed data received from the registration system unit 135, learn the facial data of the driver to create driver data, and transmit the created driver data to the authentication service unit 132. In this case, the authentication service unit 132 may register the driver data received from the registration service unit 136 in the database 133.

Figure 7:
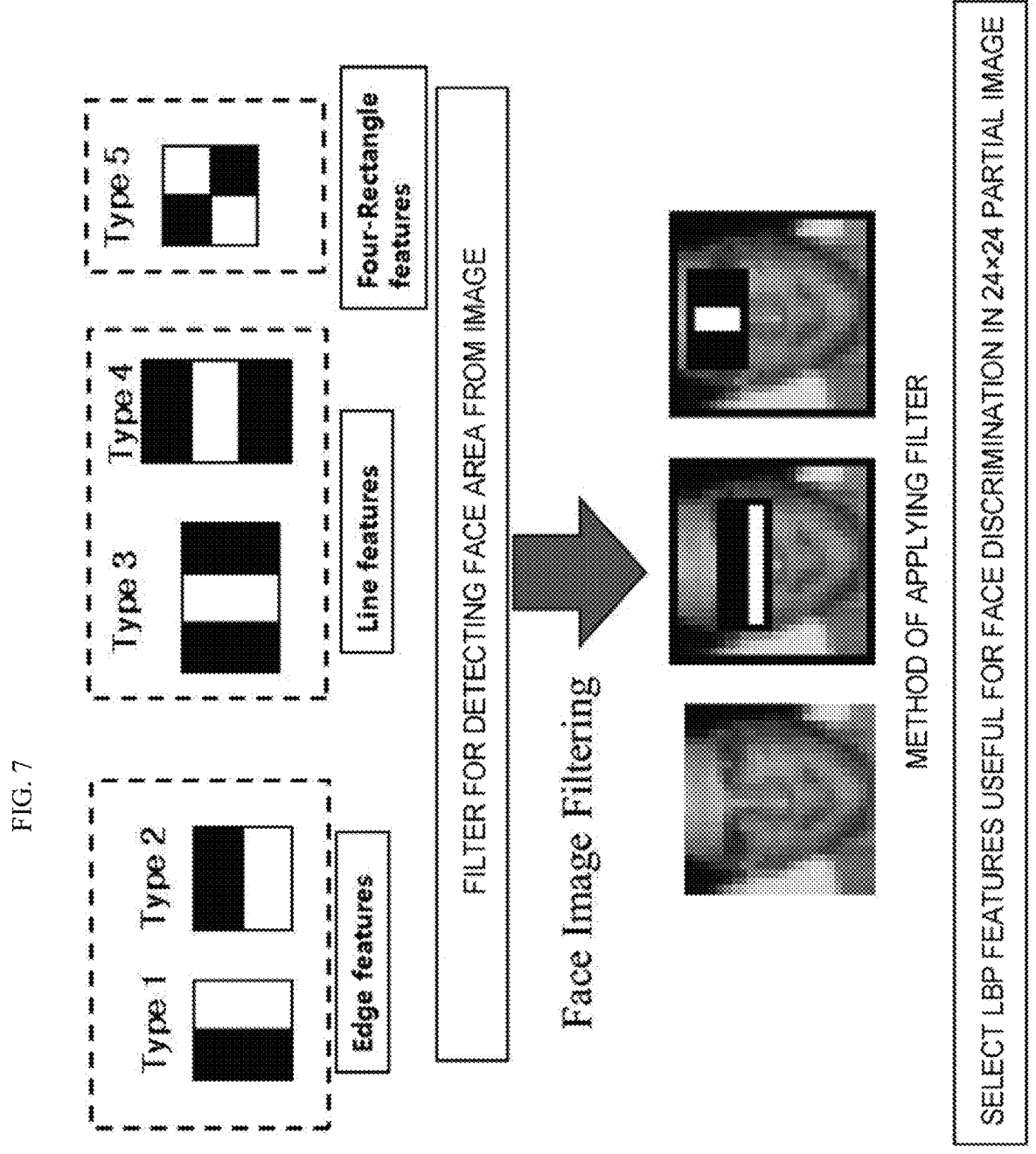
FIG. 7 is a schematic diagram illustrating a process of a local binary pattern (LBP) feature selection using an LBP-based detector.
Figure 8:
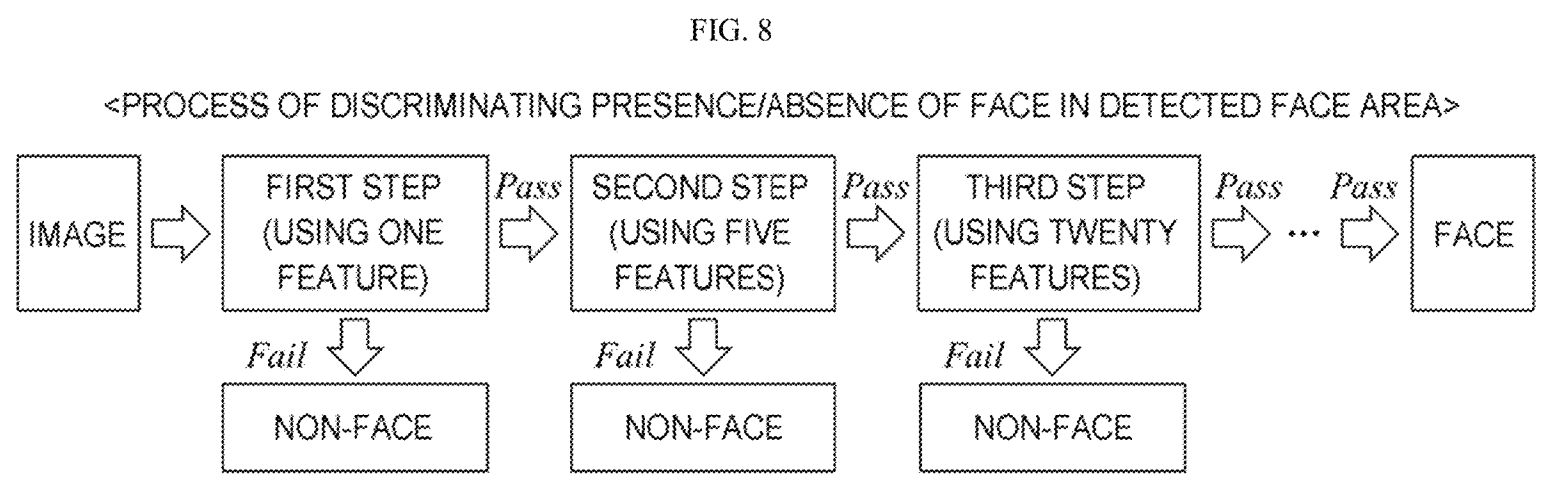
Figure 9:
FIG. 9 is a picture showing a result of face detection using the LBP detector.
Figure 9:

FIG. 7 is a schematic diagram illustrating a process of a local binary pattern (LBP) feature selection using an LBP-based detector, FIG. 8 is a schematic diagram illustrating a process of discriminating the presence or absence of a face in a face area detected using a cascade classifier, and FIG. 9 is a picture showing a result of face detection using the LBP detector.

Referring to FIGS. 7 to 9, the authentication unit 130 according to the embodiment may detect a face area detected using an LBP-based detector from the facial data of the driver on board transmitted from the face detection unit 110, and discriminate the presence or absence of a face in the detected face area using a cascade classifier.

Specifically, as shown in FIG. 7, through a process of using an LBP-based detector, a set of square-shaped filters may be used, and a result value obtained by subtracting pixel values of a black square region from the sum of pixel values of a white square region may be extracted. In this case, contours, corners, and pixel intensity may be compared for use. As shown in FIG. 8, using a cascade classifier, a user authentication image employs only one face, and the remaining areas are mostly applied as non-face areas. It is desirable to perform a multi-stage inspection to rapidly skip the non-face areas. Through the process, the face area may be rapidly and accurately detected, as shown in FIG. 9.

Figure 10:
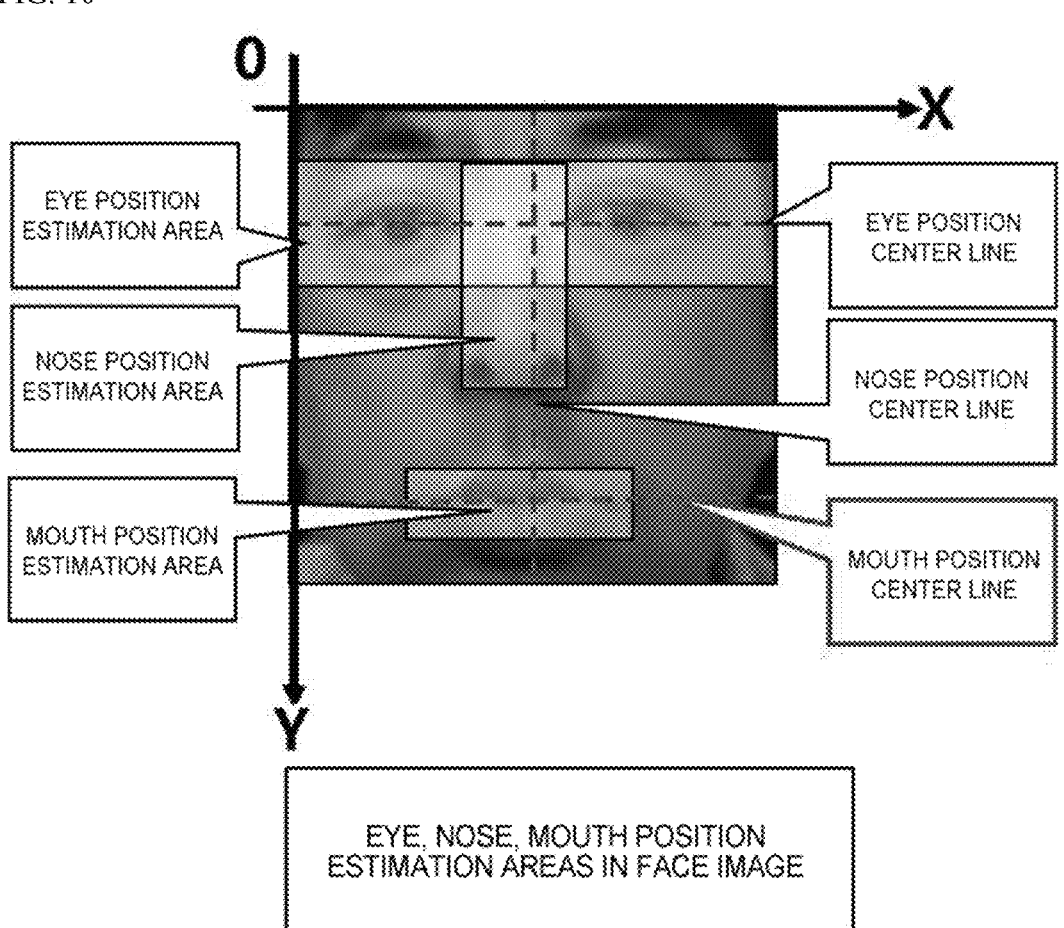
FIG. 10 is a picture showing an area estimate of a feature position and a determined center line of a feature position in a face area.
Figure 11:
FIG. 11 is a picture illustrating a process of detecting both eyes to distinguish a frontal face and detecting the nose and mouth to search for a rotation center point.
Figure 12:
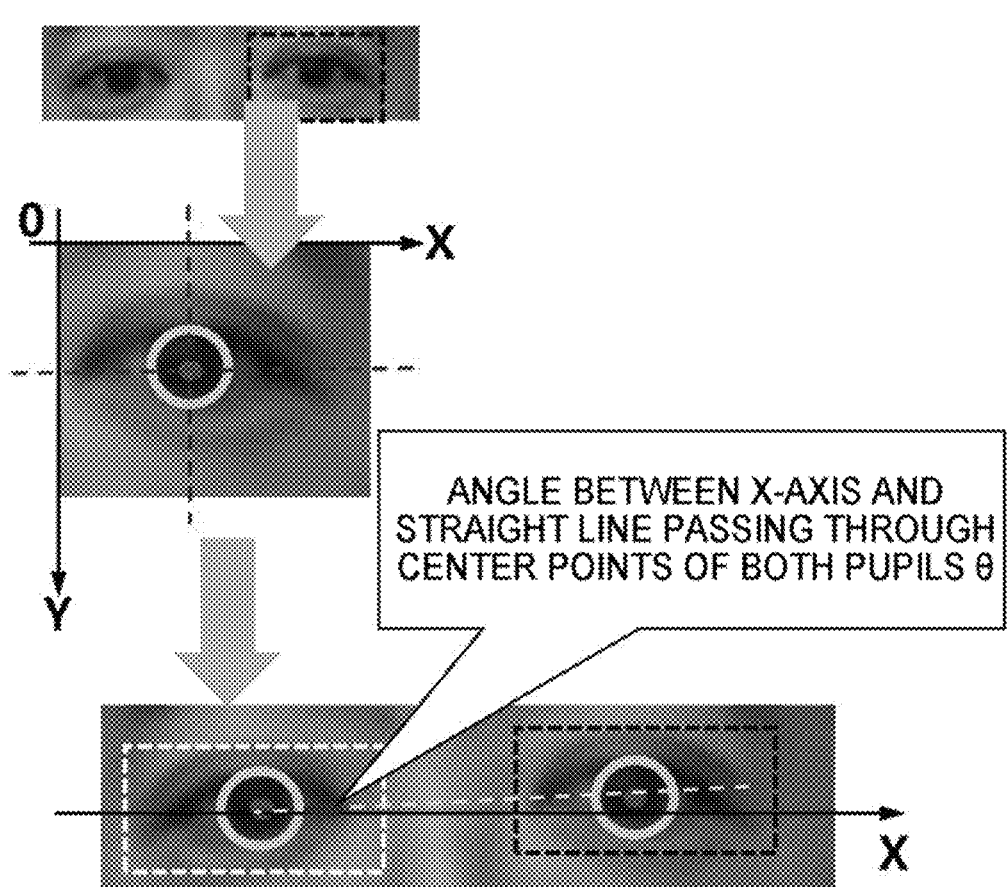
FIG. 12 is a picture illustrating pupil area extraction and an extracted rotation angle.
Figure 13:
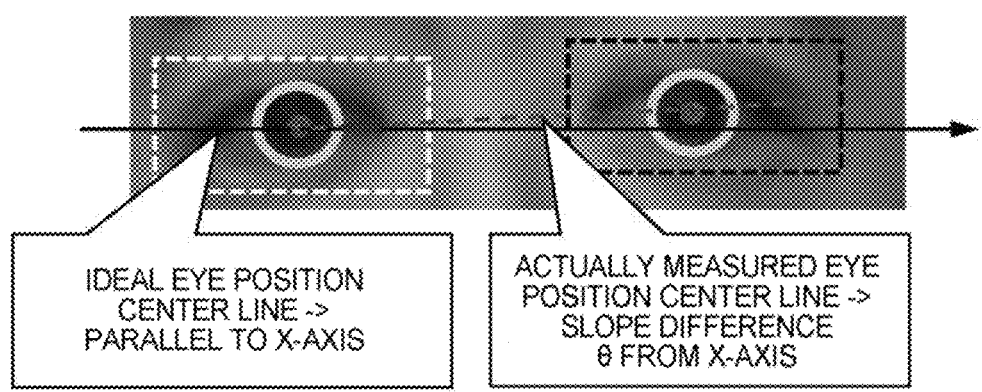
FIG. 13 is a picture illustrating a rotated face image.
Figure 13:
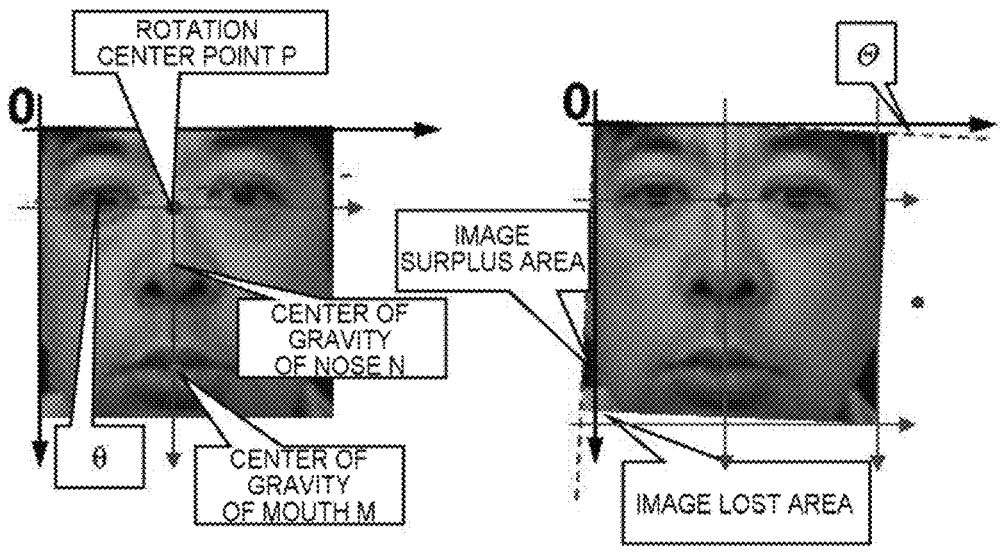

FIG. 10 is a picture showing an area estimate of a feature position and a determined center line of a feature position in a face area, FIG. 11 is a picture illustrating a process of detecting both eyes to distinguish a frontal face and detecting the nose and mouth to search for a rotation center point, FIG. 12 is a picture illustrating pupil area extraction and an extracted rotation angle, and FIG. 13 is a picture illustrating a rotated face image.

Referring to FIGS. 10 to 13, the authentication unit 130 according to the embodiment performs a face pre-processing process. In this case, the face pre-processing process includes sequentially performing a feature detection process, a geometric transformation and cropping process, a histogram equalization process, a noise control process, and an image normalization process.

The feature detection process of the face pre-processing process according to the embodiment includes detecting a right eye, a left eye, a nose, and a mouth from the facial data of the driver on board transmitted from the face detection unit 110, extracting a pupil area for each eye, and finally confirming an area for both eyes and measuring a face direction using the positions of the nose and the mouth. The geometric transformation and cropping process of the face pre-processing process includes rotating the face such that the centers of both eyes are horizontal, adjusting the size of the face such that a space between the eyes is always the same, and finally transforming the face such that the eyes are always kept at a horizontal center and located at a desired height. In addition, the image normalization process of the face pre-processing process includes generating a mask image, removing undesired parts, and finally resizing a synthesized image to a preset size.

Specifically, as shown in FIG. 10, the position of the eyes is provided between 20% and 40% in height and 20% and 80% in width of the face image. The position of the nose is provided between 20% and 60% in height and 40% and 60% in width of the face image. The position of the mouth is provided between 70% and 90% in height and 30% and 70% in width of the face image. In this case, each center line of the eyes, the nose, and the mouth may be obtained by extracting an object from the above described three estimated areas, calculating the center of gravity of the object, and then finding a line passing through the center of gravity parallel to an X or Y axis.

As shown in FIG. 11, authentication requires a front face, and in order to determine presence/absence of a front face, detection of both left and right eyes is required. When the positions of both eyes are not exactly horizontal, the image of the face area (a face rectangle) needs to be rotated to achieve horizontal alignment. Such a process is performed for sample normalization, and it is desirable to use the positions of the nose and mouth to find the rotation center point.

As shown in FIG. 12, left and right eye areas may be separated from the eye estimation area (in which left/right areas are not separated) through a proportional equation using the nose area. In this case, a pupil area may be separated through object extraction for each of the separated left and right eye areas. A first-order linear equation passing through the centers of gravity of the two separated pupil areas may be obtained. It is desirable to use the angle θ between the obtained first-order linear equation and the X-axis as the rotation angle of the entire image.

As shown in FIG. 13, in order to generate a normalized dataset, feature patterns of the eyes, nose, and mouth, and image sizes need to have uniform distribution. Face images extracted from images input from actual cameras are not present in a uniform pattern. For normalization of samples, a first-order linear equation passing through the centers of gravity of the two separated pupil areas is obtained. Additionally, a first-order linear equation passing through the center points of the nose and mouth is obtained, and a point at which the two equations have a common solution is determined as a rotation center point P. In this case, rotating an image by the rotation angle θ about the rotation center point P results in an image in which the positions of both eyes (the center points) are present on the same X-axis.

Figure 14:
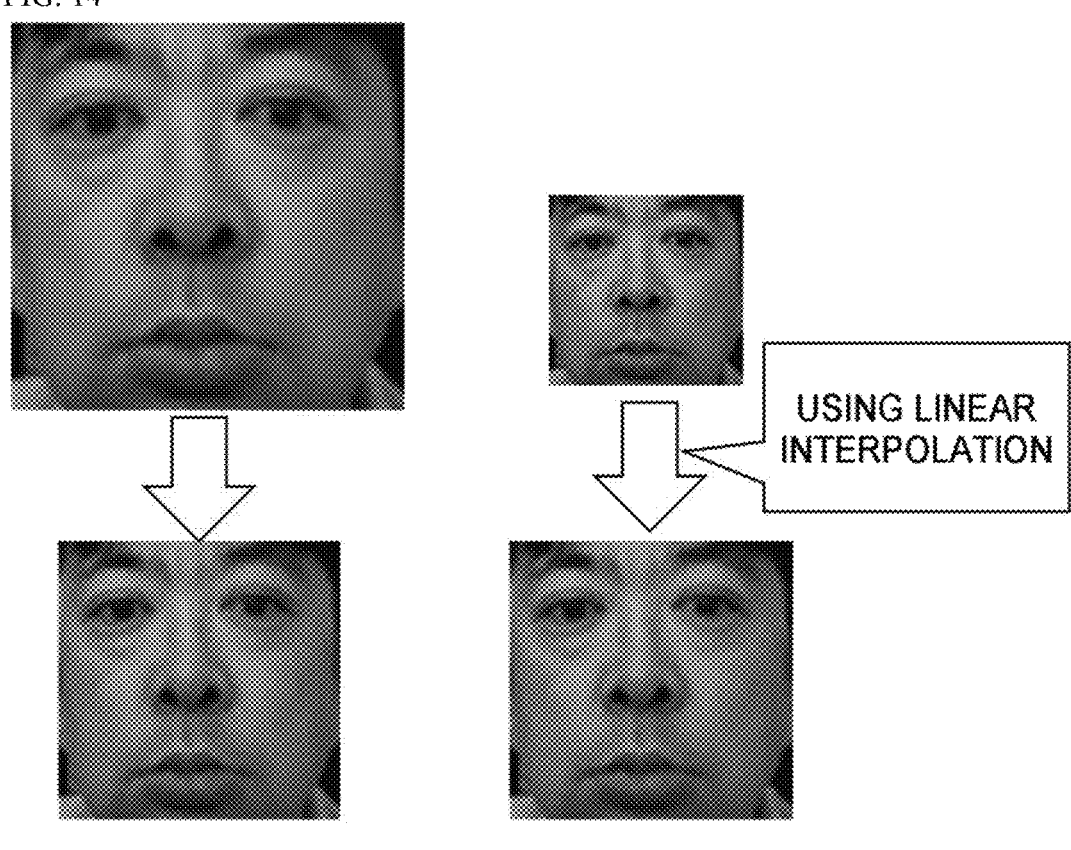
FIG. 14 is a picture illustrating a process of improving the image quality using facial image resizing linear interpolation.
Figure 15:
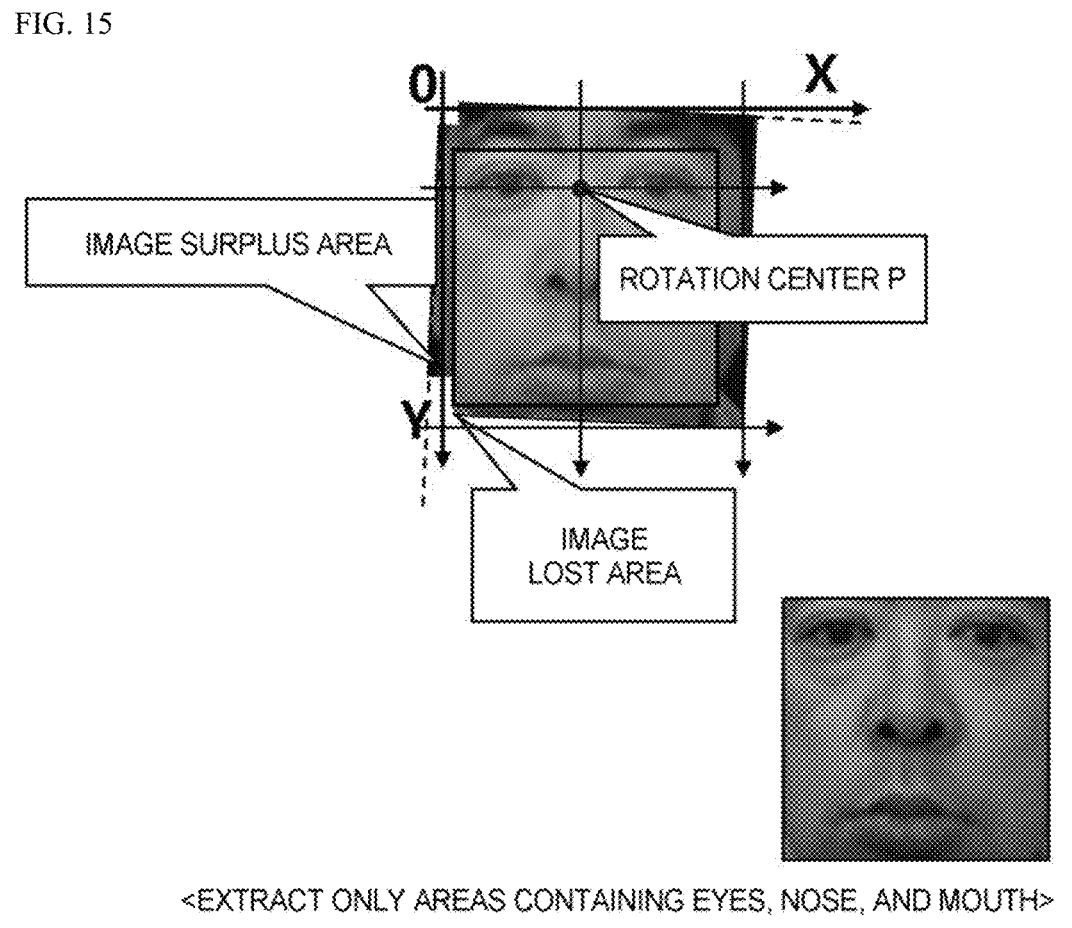
Figure 16:
FIG. 16 is a picture illustrating a process of generating an image through histogram equalization.
Figure 16:
Figure 17:
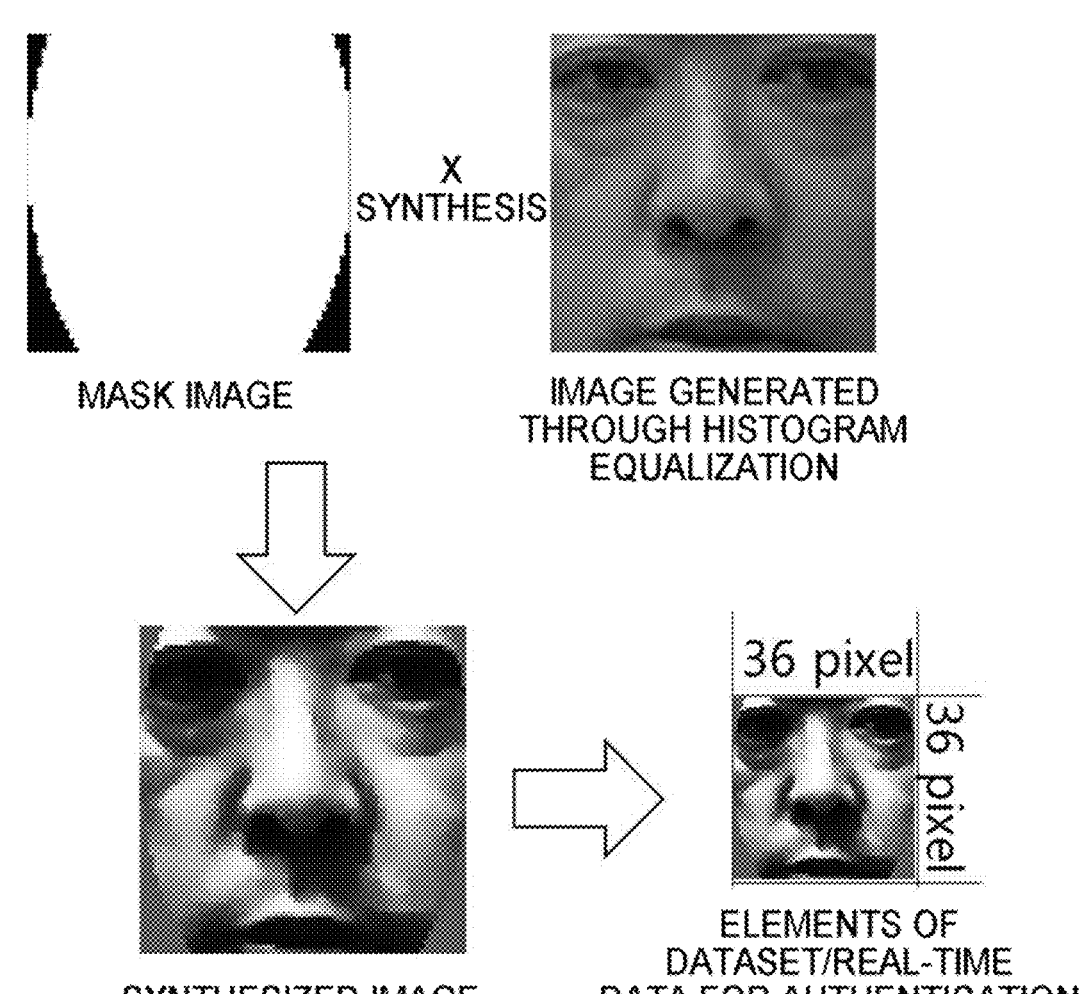
FIG. 17 is a picture illustrating a process of generating a mask image and synthesizing an image.

FIG. 14 is a picture illustrating a process of improving the image quality using facial image resizing linear interpolation, FIG. 15 is a picture illustrating a process of removing an area outside the face, FIG. 16 is a picture illustrating a process of generating an image through histogram equalization, and FIG. 17 is a picture illustrating a process of generating a mask image and synthesizing an image.

Referring to FIG. 14, the varying distance between the actual camera and the face causes the sizes of face images extracted through the above process to be inconsistent, making it difficult to construct a normalized dataset. To compensate for such a constraint, the horizontal and vertical sizes of the images need to be uniformly resized to construct datasets. To this end, the image is subjected to an enlargement/reduction process to achieve a uniform size. In this case, the image has degradation during the image enlargement process, and thus it is desirable to improve image quality using linear interpolation.

As shown in FIG. 15, the process of removing the area outside the face is a process to remove surplus areas and lost areas and suppress elements of parts other than face parts that have frequent changes, such as eyebrows and facial hair, as much as possible. Based on the rotation center point P, areas outside the left and right eye areas and the mouth area are set as removal areas such that only the areas that clearly contain the eyes, nose, and mouth are used as the face area.

As shown in FIG. 16, the process of histogram equalization of the face pre-processing process is a process to address the issues of uneven brightness and pixel distribution of the overall image due to external factors (lighting, white balancing, noise, etc.). The face area is largely divided into three parts, histogram equalization is performed on each part, and the results are globally subjected to histogram equalization. In this case, a sample image with overall uniformity of brightness and pixel distribution may be obtained as shown in FIG. 16.

As shown in FIG. 17, the mask image generation and image synthesis process of the face pre-processing process includes generating a white ellipse image (a mask image) inside a black-filled image, and then combining the image generated through histogram equalization with the mask image to remove elements that are unnecessary in extracting feature vectors, and finally resizing the synthesized image to 36×36 dimensions to complete elements of a dataset. In this case, it is desirable to apply the same method as in constructing the dataset elements to real-time authentication discrimination data.

Figure 18:
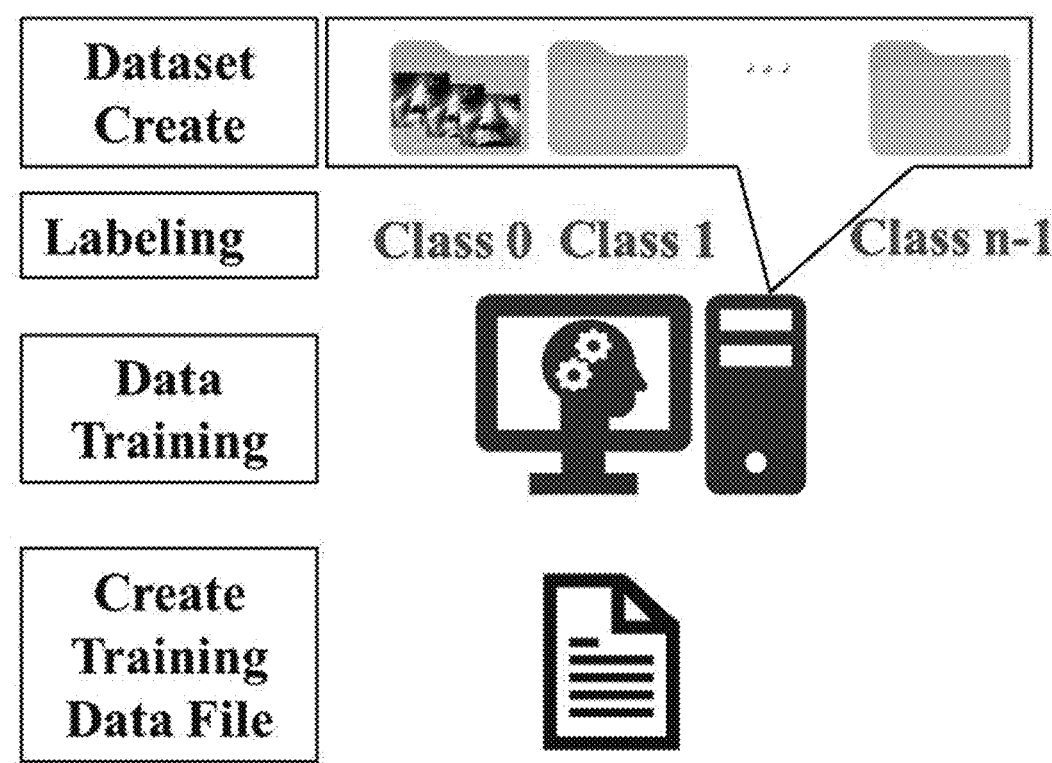
FIG. 18 is a schematic diagram illustrating a process of dataset creation and data training using AI.
Figure 19:
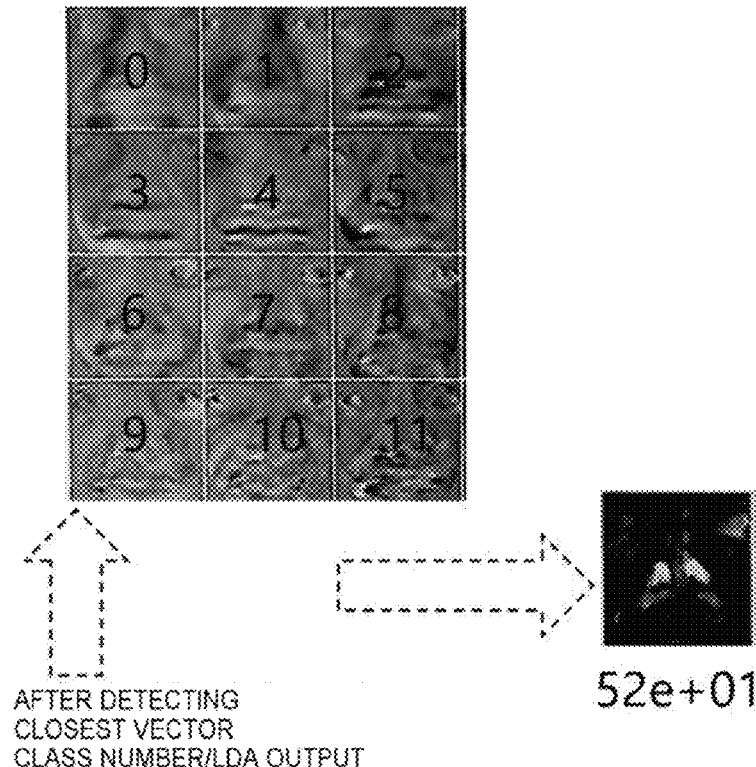
FIG. 19 is a picture illustrating a process of principle component detection and linear discriminant analysis using LBPH.

FIG. 18 is a schematic diagram illustrating a process of dataset creation and data training using AI. FIG. 19 is a picture illustrating a process of principle component detection and linear discriminant analysis using LBPH.

Referring to FIGS. 18 and 19, the authentication unit 130 according to the embodiment performs a face data collection and training data creation process after a face pre-processing process.

Specifically, the face data collection and training data creation process includes collecting a specified number of image samples generated through the face pre-processing process, assigning labels to the database 133, classifying the database 133, and then training the classified database 133 to create data.

As shown in FIG. 18, the process of dataset creation and data training using AI includes collecting data for each constructed dataset, performing labeling (assigning class numbers) on N datasets, completing classification through training, and then generating a training data file. In this case, after a specified period of time, the dataset is automatically updated, and data training is executed and thus a data file is regenerated (using reinforcement learning).

Referring to FIG. 19, the authentication unit 130 according to the embodiment performs a face recognition and authentication granting process after the face data collection and training data creation process.

Specifically, the facial recognition and authentication granting process includes, with respect to a face image transmitted from the remote control station 120 upon a request for real-time authentication, extracting a labeled driver identification key (a class number) using a discriminator running in the authentication service unit 132, determining a similarity between the face image currently transmitted from the remote control station 120 and training data, and when a criterion is satisfied, searching for user information in the database 133 and transmitting a result of the searching to the remote control station 120, and allowing the remote control station 120 that has completed authentication granting to log in to the construction equipment to complete an authentication procedure.

As described above, the system 100 for authenticating a remote driver in real time includes a face detection unit 110, a remote control station 120, and an authentication unit 130 which perform a specific function, thereby providing a system for authenticating a remote driver in real time, by which an authentication process in the use of construction site equipment is performed through a simple approach and thus the inconvenient authentication process can be simplified, and unregistered drivers are prevented from operating the equipment and thus the threat of equipment theft through physical access can be fundamentally blocked.

According to the present invention, the system for authenticating a remote driver in real time includes a face detection unit, a remote control station, and an authentication unit which perform a specific function, by which an authentication process in the use of construction site equipment is performed through a simple approach and thus the inconvenient authentication process can be simplified, and unregistered drivers are prevented from operating the equipment and thus the threat of equipment theft through physical access can be fundamentally blocked.

Only some specific embodiments of the present disclosure have been described in the detailed description above. However, it should be understood that the present disclosure is not limited to specific forms mentioned in the detailed description, and all modifications, equivalents, and substitutes within the spirit and scope of the present disclosure defined by the appended claims fall within the present disclosure.

That is, the present disclosure is not limited to the specific embodiments and description given above, and those of ordinary skill in the art to which the present disclosure pertains may make various modifications without departing from the gist of the present disclosure claimed in the claims. Such modifications belong to the protection scope of the present disclosure.

What is claimed is:

1. A system for authenticating a remote driver in real time, the system comprising:

a face detection unit mounted on construction equipment to detect a face of a driver on board;

a remote control station configured to transmit facial data of the driver on board detected through the face detection unit to an authentication unit, receive a driver information search result and an authentication determination result from the authentication unit, and start the construction equipment; and the authentication unit configured to search for the facial data of the driver on board received from the remote control station from driver information data stored in a database and transmit the driver information search result and the authentication determination result to the remote control station, the authentication unit includes:

an authentication system unit configured to pre-process the facial data of the driver transmitted from the face detection unit, and then encode the pre-processed data and transmit the encoded pre-processed data to an authentication service unit;

the authentication service unit configured to decode the pre-processed data received from the authentication system unit, and then retrieve learned data to extract a driver key value and search driver information stored in the database, determine whether to authenticate based on a result of searching the driver information from the database, and transmit an authentication determination result to the remote control station; and a control unit configured to receive a login execution signal from the remote control station according to the authentication determination result received from the authentication service unit and then transmit a driving signal of the construction equipment to the remote control station, a registration system unit configured to pre-process the facial data of the driver on board transmitted from the face detection unit, and then encode the pre-processed data and transmit the encoded pre-processed data to a registration service unit; and the registration service unit configured to decode the pre-processed data received from the registration system unit and then learn the facial data of the driver to create driver data, and transmit the created driver data to the authentication service unit, wherein the authentication service unit registers the driver data received from the registration service unit in the database, wherein the authentication unit is configured to: detect a face area using a local binary pattern (LBP)-based detector from the facial data of the driver on board transmitted from the face detection unit, and discriminate presence or absence of a face in the detected face area using a cascade classifier, and is controlled by:

a face pre-processing process in which a feature detection process, a geometric transformation and cropping process, a histogram equalization process, a noise control process, and an image normalization process are sequentially performed;

a face data collection and training data creating process in which a specified number of image samples generated through the face pre-processing process are collected and labels are assigned to the database and the database is classified, and the classified database is trained to create data; and a face recognition and authentication granting process in which, with respect to a face image transmitted from the remote control station upon a request for real-time authentication, a labeled driver identification key corresponding to a class number is extracted using a discriminator running in the authentication service unit, a similarity between the face image currently transmitted from the remote control station and training data is determined, and when a criterion is satisfied, user information in the database is searched for and a result of searching the user information is transmitted to the remote control station, and the remote control station that has completed authentication granting logs in to the construction equipment to complete an authentication procedure.

2. The system of claim 1, wherein the feature detection process of the face pre-processing process includes:

detecting a right eye, a left eye, a nose, and a mouth from the facial data of the driver on board transmitted from the face detection unit;

extracting a pupil area for each eye; and confirming an area for both eyes and measuring a face direction using positions of the nose and the mouth, the geometric transformation and cropping process of the face pre-processing process includes:

rotating the face of the driver such that centers of both eyes are horizontal;

adjusting a size of the face of the driver such that a space between the eyes is always the same; and transforming the face of the driver such that the eyes are always kept at a horizontal center and located at a desired height, and the image normalization process of the face pre-processing process includes:

generating a mask image;

removing undesired parts; and resizing a synthesized image to a preset size.

* * * * *